United States Patent [19]
Scheufler

[11] Patent Number: 5,399,249
[45] Date of Patent: Mar. 21, 1995

[54] METAL RECOVERY DEVICE

[76] Inventor: Gert Scheufler, Kodak AG, Stuttgart, Germany

[21] Appl. No.: 663,825
[22] PCT Filed: Sep. 26, 1989
[86] PCT No.: PCT/EP89/01124
 § 371 Date: Sep. 27, 1993
 § 102(e) Date: Sep. 27, 1993
[87] PCT Pub. No.: WO90/03456
 PCT Pub. Date: Apr. 5, 1990

[30] Foreign Application Priority Data

Sep. 27, 1988 [DE] Germany .................. 38 32 674.4

[51] Int. Cl.⁶ .................. C25C 7/00; C25C 7/08
[52] U.S. Cl. .................. 204/226; 204/272; 204/227
[58] Field of Search .......... 204/226, 227, 109, 216, 204/272

[56] References Cited

U.S. PATENT DOCUMENTS

| | | | |
|---|---|---|---|
| 2,099,873 | 11/1937 | Sterngels . | |
| 2,880,156 | 3/1959 | Benner et al. | 204/226 |
| 3,477,926 | 11/1969 | Snow et al. | 204/109 |
| 3,540,991 | 11/1970 | Green . | |
| 3,847,779 | 11/1974 | Sekine et al. . | |
| 4,028,199 | 6/1977 | Holland | 204/109 X |
| 4,097,347 | 6/1978 | Packer | 204/109 |
| 4,105,534 | 8/1978 | Beatty . | |
| 4,302,319 | 11/1981 | Ueno . | |
| 4,406,753 | 9/1983 | Blake et al. | 204/272 X |
| 4,508,599 | 4/1985 | Ott et al. . | |

FOREIGN PATENT DOCUMENTS

| | | |
|---|---|---|
| 058537 | 2/1982 | European Pat. Off. . |
| 2141893 | 6/1972 | France . |
| 2543600 | 9/1975 | Germany . |
| 2092178 | 1/1981 | United Kingdom . |

*Primary Examiner*—Donald R. Valentine

[57] ABSTRACT

A device for electrolytically recovering metal, in particular silver, from a photographic processing solution, said device having an anode located in a recovery chamber and a movably arranged cathode as well as a scraper for removing metal, in particular silver, deposited on said cathode. For the purpose of electrolytically depositing metal (17), cathode (12, 32, 42) is held stationary in its operating position within the solution (16). For removal of the metal, the metal-loaded cathode (12, 32, 42) is moved out of its operating position within the solution (16) and is brought into engagement with the scraper (14, 20, 34, 44) arranged outside the solution (16). Subsequently, the cathode (12, 32, 42) freed from metal (17) returns to its operating position within the solution (16) for a repeated electrolytic deposition of metal (17).

5 Claims, 1 Drawing Sheet

METAL RECOVERY DEVICE

FIELD OF THE INVENTION

The invention relates to a device for electrolytically recovering metal, in particular silver, from a photographic processing solution, the device comprising an anode located in a recovery chamber and a cathode arranged for movement from a first position within the liquid to a second position outside the liquid as well as a scraper for removing metal deposited on the cathode.

BACKGROUND OF THE INVENTION

U.S. Pat. NO. 2,099,873 discloses a machine for electrolytically recovering metal, e.g. from a chromium-containing solution, using a cathode formed of a flexible metal belt. The belt moves around a large drum and a number of deflecting rollers arranged adjacent to the drum. The drum is supported by a shaft extending across the level of the solution and is partly submerged in the chromium-containing solution. For the purpose of recovering metal, the drum is constantly rotated so that the belt cathode moves continuously around the drum and the deflecting rollers. A curved anode arranged eccentrically to the drum axis runs at a small distance to the surface of the drum section submerged in the solution and the belt cathode moving over the drum.

When the belt cathode moving out of the solution leaves the periphery of the drum, it extends in horizontal direction to the first deflecting roller, is then guided downwards and, moving over further deflecting rollers arranged in a separate water tank outside the tank holding the chromium-containing solution, returned to the drum.

Due to the fact that the belt cathode is sharply bent while moving over the deflecting rollers, most of the metal having deposited on the flexible belt cathode is released therefrom and collected in the water tank or in a foraminous container nested therein. Any residual particles still adhering to the belt are removed by two scrapers contacting the belt.

The large diameter and the width of the drum are required to obtain a peripheral surface as large as possible because only a portion is submerged in the solution. The belt cathode is dimensioned such that the area covering the submerged peripheral section of the drum is of substantially the same size as the submerged section. As a result, there is always a fairly large deposition surface of the arcuate anode facing the belt cathode contacting the rotating drum.

Due to the above mentioned design features, however, the known metal recovery machine has exceptionally large dimensions. Supporting and driving mechanisms of the amply dimensioned drum are technically sophisticated and expensive. Moreover, removal of the deposited metal is very complicated. Also, due to the continuous movement of the belt cathode, the amount of metal deposited is very small.

SUMMARY OF THE INVENTION

It is the object of the present invention to provide a metal recovery device of the generic type which comprises a relatively small apparatus which is uncomplicated in design and the cathode of which shows an optimally sized surface on which a large quantity of metal can be deposited. Moreover, a scraper device and a collecting device for the scraped off metal are provided such that the two devices can be jointly removed without difficulty and reinserted without difficulty.

According to the present invention, the object is attained in that the cathode is designed as a hollow-cylindrical circular cathode which in a first position surrounds a vertically arranged cylindrical anode (41) and, which in a second position is located above the anode and is engaged with the scraper (44) and will remain in engagement therewith until it has returned to the first position.

BRIEF DESCRIPTION OF THE DRAWINGS

Further features and advantages will be apparent from the claims as well as the description of an embodiment shown schematically in the drawing wherein:

DETAILED DESCRIPTION OF THE INVENTION

Figure 1:
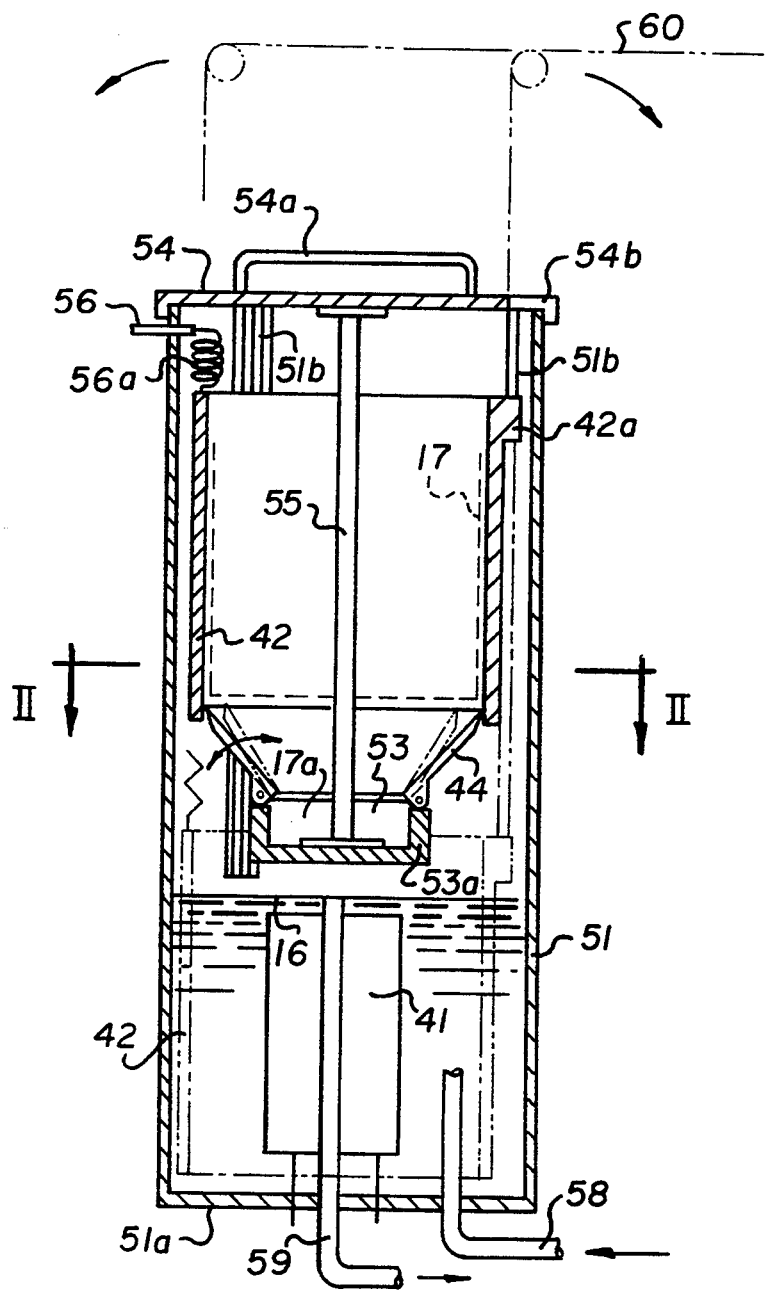
FIG. 1 is a longitudinal sectional view of the silver-recovery device according to the invention.
Figure 2:
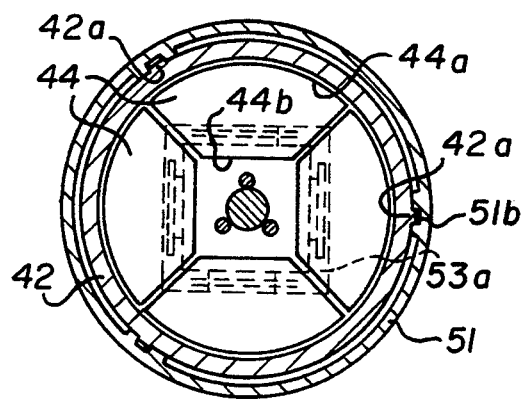
FIG. 2 is a sectional view along line II—II of the silver-recovery device according to FIG. 1.

FIGS. 1 and 2 show a silver recovery device in a schematic representation. The device comprises a recovery chamber 51 designed as a vertically extending hollow cylinder and is provided in its bottom 51a with a feed pipe 58 and a drain pipe 59 extending upwardly from the middle of the bottom. Both pipes are connected to a film-processing unit by a hose. The level of the solution depends on the height of the drain pipe 59 and amounts to about one third of the height of the recovery chamber 51.

Cathode 42 is a hollow-cylindrical circular cathode which surrounds a cylindrical anode 41 arranged in an upright position on the bottom 51a to which it is electrically connected. Anode 41 terminates a small distance below the liquid level. The circular cathode 42 is suspended by two ropes 60 which are passed through two slots 54b formed at the edge of cover 54 and about two deflecting rollers to a winding device. In the area of its upper edge extending above the liquid level circular cathode 42, is provided with three projections 42a uniformly spaced about its circumference. These projections are received in three vertically extending guide grooves 51b which starts above the level of the solution in the inner cylindrical surface of the hollow-cylindrical recovery chamber 51. In this manner the circular cathode 42 is held and guided for sliding movement in the vertical direction when it is lifted from the solution 16 and subsequently lowered into the solution either manually or automatically. Below cover 54, a connecting terminal 56 is plugged through the wall of the recovery chamber 51 for connecting with the circular cathode 42 an electric line 56 designed as a spiral cable.

The collecting bin for the metallic silver scraped off is denoted 53. It is mounted above the level of the solution by a downwardly extending mounting bar 55 arranged on cover 54 and comprises a box open at the top and having a substantially square base on the four side walls 53a of which a scraper 44 each designed as a conical segment is pivotally mounted. The inner edges 44b of the scrapers 44, which face towards the center, extend rectilinearly and substantially parallel with the side walls 53a of the bin.

In this embodiment the circular cathode 42 is also moved out of the solution in response to a timing control, the circular cathode 42 being lifted out of the solution into the position shown in full lines in FIG. 1 and lowered again into the solution 16 immediately afterwards at timed intervals within a cycle of movements.

While circular cathode 42 is being moved upward, the scrapers 44 are in a retracted position shown in dash-dotted lines. Before the circular cathode 42 is once again lowered into the solution, the scrapers are pivoted outwardly by means not shown. Since the scrapers 44 are hinged such that they extend obliquely upwardly, they form a funnel or chute and, when in their operative position, are brought into engagement with the silver carrying inner wall of the circular cathode 42 by means of their circular scraping edges 44a, the silver deposit 17 being scraped off during lowering of the circular cathode 42 and dropping into bin 53.

In order to remove the silver scraped off, the two deflecting rollers of the rope arrangement 60 are pivoted aside. Subsequently, the cover together with the collecting bin 53 attached to it is lifted by means of a grip 54a and the bin emptied.

The inner wall of circular cathode 42 facing the anode has a rough surface treated with a sandblast or sand paper. As long as the silver deposited on the rough cathode surface is moist, it can be removed without problems by the scraper 44 during the lowering movement of the circular cathode 42.

I claim:

1. Apparatus for electrolytically recovering metal, in particular silver, from a photographic processing solution, comprising; an anode (41) located in a recovery chamber (51) and a cathode (42) arranged for movement from a first position within the solution to a second position outside the solution as well as a scraper (44) for removing metal deposited on the cathode (42), the cathode being designed as a hollow-cylindrical circular cathode (42) which in the first position surrounds a vertically arranged cylindrical anode (41) and which in the second position is located above the anode (41) and is engaged with the scraper (44) and will remain in engagement therewith until the cathode has returned to the first position.

2. Apparatus according to claim 1, wherein the recovery chamber (51) is designed as a hollow cylinder and a collecting bin (53) for scraped-off metal (17a) is held above the level of the solution by a holding bar (55), the holding bar being arranged on a cover (54) of the recovery chamber (51) and extending downwardly.

3. Apparatus according to claim 2, wherein the collecting bin (53) comprises a box open at the top and having a substantially square base, a scraper (44) designed as a conical segment being mounted for pivotable or shiftable movement on each of the four side walls (53a) of the bin.

4. Apparatus according to claim 3, wherein the scrapers (44) have inner edges (44b) which face towards the center and extend rectilinearly and substantially parallel to the side walls (53a) of the collecting bin (53); and the scrapers (44) are hingedly connected in an upwardly inclined position such that they form a funnel and, by means of circular scraping edges (44a), are brought into engagement with an inner wall of the circular cathode (42) in the second position.

5. Device according to claim 1, wherein an inner wall surface of the circular cathode (42) has been roughened by a sand blast or by pressing sand paper on the inner wall surface.

* * * * *

UNITED STATES PATENT AND TRADEMARK OFFICE
CERTIFICATE OF CORRECTION

PATENT NO. : 5,399,249
DATED : March 21, 1995
INVENTOR(S) : Gert Scheufler

It is certified that error appears in the above-indentified patent and that said Letters Patent is hereby corrected as shown below:

On Title Page

Assignee should be "Eastman Kodak Company."

Signed and Sealed this

Thirtieth Day of May, 1995

Attest:

BRUCE LEHMAN

*Attesting Officer*  *Commissioner of Patents and Trademarks*